US012699172B2

(12) United States Patent
Sanson et al.

(10) Patent No.: US 12,699,172 B2
(45) Date of Patent: Aug. 4, 2026

(54) FMCW RADAR WITH DYNAMIC WAVEFORM MODEL BASED ON EGO MOTION

(71) Applicant: GM Cruise Holdings LLC, San Francisco, CA (US)

(72) Inventors: Jessica Bartholdy Sanson, Munich (DE); Kalin Hristov Kabakchiev, Munich (DE); Andre Giere, Oberpframmern (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 354 days.

(21) Appl. No.: 18/468,932

(22) Filed: Sep. 18, 2023

(65) Prior Publication Data

US 2025/0052883 A1 Feb. 13, 2025

(30) Foreign Application Priority Data

Aug. 10, 2023 (EP) ..................................... 23190922

(51) Int. Cl.
| | |
|---|---|
| *G01S 13/34* | (2006.01) |
| *G01S 7/282* | (2006.01) |
| *G01S 7/292* | (2006.01) |
| *G01S 13/931* | (2020.01) |

(52) U.S. Cl.
CPC ............ G01S 13/343 (2013.01); G01S 7/282 (2013.01); G01S 7/292 (2013.01); G01S 13/931 (2013.01)

(58) Field of Classification Search
CPC ........ G01S 13/343; G01S 7/282; G01S 7/292; G01S 13/931
See application file for complete search history.

(56) References Cited

U.S. PATENT DOCUMENTS

| | | | | |
|---|---|---|---|---|
| 2018/0074181 A1* | 3/2018 | Kishigami | ............ | G01S 13/282 |
| 2020/0174096 A1* | 6/2020 | Cho | ..................... | G01S 13/343 |
| 2020/0191939 A1* | 6/2020 | Wu | ........................ | G01S 7/354 |

(Continued)

FOREIGN PATENT DOCUMENTS

| | | | | |
|---|---|---|---|---|
| CN | 110832340 A | * | 2/2020 | ............. G01S 13/34 |

OTHER PUBLICATIONS

Extended European Search Report for European Application No. 23190922.7, Date of Mailing Feb. 5, 2024, 11 pages.

(Continued)

*Primary Examiner* — Marcus E Windrich
(74) *Attorney, Agent, or Firm* — CANTOR COLBURN LLP

(57) ABSTRACT

A radar sensor system comprises a transmit antenna configured to transmit a radar signal into an environment of the radar sensor system, and a receive antenna configured to receive a return signal from the environment of the radar sensor system responsive to the radar signal. The radar sensor system further comprises radar processing circuitry that is configured to perform acts comprising transmitting a radar signal having a predefined pulse repetition interval (PRI). The acts further comprise monitoring ego velocity of the radar sensor and detecting that the ego velocity has exceeded a first predetermined ego velocity threshold. The acts also comprise decreasing the predefined pulse repetition interval (PRI) based on the first predetermined ego velocity threshold.

20 Claims, 9 Drawing Sheets

(56)     References Cited

U.S. PATENT DOCUMENTS

| | | | |
|---|---|---|---|
| 2021/0190943 A1* | 6/2021 | Hakobyan | G01S 13/86 |
| 2022/0144287 A1 | 5/2022 | Seo | |
| 2022/0146664 A1 | 5/2022 | Ichiki | |
| 2022/0334240 A1* | 10/2022 | Wu | G01S 13/582 |
| 2024/0077601 A1* | 3/2024 | Wang | G01S 7/417 |
| 2024/0201360 A1* | 6/2024 | Lessmann | G01S 13/60 |

OTHER PUBLICATIONS

Kan Tang et al: "Implementation of Real-time Automotive SAR Imaging", 2020 IEEE 11th Sensor Array and Multichannel Signal Processing Workshop (SAM), IEEE, Jun. 8, 2020 (Jun. 8, 2020), pp. 1-4.

\* cited by examiner

FMCW RADAR WITH DYNAMIC WAVEFORM MODEL BASED ON EGO MOTION

RELATED APPLICATION

This application claims priority to European Patent Application No. 23190922.7, filed on Aug. 10, 2023, and entitled "FMCW RADAR WITH DYNAMIC WAVEFORM MODEL BASED ON EGO MOTION". The entirety of this application is incorporated herein by reference.

BACKGROUND

Autonomous or assisted driving strategies have been facilitated through sensing an environment around a vehicle. Radar sensors are conventionally used in connection with detecting and classifying objects in an environment; advantages of radar over other types of sensors (such as cameras or lidar) include robustness in regard to lighting and weather conditions. Often, radar sensors are deployed with cameras and/or lidar sensors to provide different modes of detection and redundancy. In certain scenarios, performance of lidar and/or cameras is negatively impacted by environmental features, such as fog, rain, snow, bright sunlight, lack of adequate light, etc. Accordingly, in these scenarios, radar is relied heavily upon to detect and classify objects in the environment, while lidar and camera sensors are less heavily relied upon.

In connection with navigating an environment, an autonomous vehicle perceives objects surrounding the autonomous vehicle based upon sensor signals generated by sensor systems of the autonomous vehicle. For example, the autonomous vehicle may include a sensor system, such as a radar sensor system, for generating sensor signals. The autonomous vehicle also includes a centralized processing device that receives data based upon sensor signals generated by the sensor system and performs a variety of different tasks, such as detection of vehicles, pedestrians, and other objects. Based on an output of the processing device, the autonomous vehicle may perform a driving maneuver.

Radar sensor systems exhibit some advantages over other sensor systems such as lidar sensor systems and cameras with respect to their usage in autonomous vehicles. For instance, compared to cameras and lidar sensor systems, performance of radar sensor systems is more invariant to weather changes, such that data generated by a radar sensor system can be used to enable autonomous driving under certain weather conditions (such as heavy rain or snow). In addition, radar sensor systems are able to capture velocity information nearly instantaneously. Further, radar sensor systems have a greater range than cameras and lidar sensor systems.

Radar sensor systems emit radar signals into a surrounding environment. The radar sensor signals reflect off objects in the environment and the radar sensor system then detects the reflected radar signals. Conventionally, the radar sensor system is configured to construct data tensors based upon the reflected radar signals, where a data tensor has bins across several dimensions. Example dimensions include range, doppler (velocity), and beam. The radar sensor system then generates point clouds based upon the data tensors and transmits the point clouds to the centralized processing device, where the centralized processing device identifies objects in the environment of the autonomous vehicle based upon the point clouds.

However, due to hardware limitations, there is often a tradeoff between resolution (e.g., range and/or angular resolution) and unambiguous velocity in conventional radar sensor systems. Further, performance of conventional radar systems commonly is detrimentally impacted when such radar systems are moving at high speeds.

SUMMARY

The following is a brief summary of subject matter that is described in greater detail herein. This summary is not intended to be limiting as to the scope of the claims.

Described herein are various technologies relating to radar sensor systems, and more specifically, radar sensor systems employed in autonomous vehicles, aircrafts, watercrafts, and the like. With more particularity, various technologies described herein relate to controlling resolution of radar sensor systems using ego motion information of the radar sensor(s).

In radar sensor systems, velocity estimation ambiguity can be particularly problematic in applications where the velocity of a target in the radar-monitored environment needs to be accurately measured. One way to overcome this problem is by designing a frequency modulated continuous wave (FMCW) waveform that can compensate for expected target velocity ambiguity using ego motion information. "Ego motion" and "ego velocity" as used herein refer to the motion and velocity of the radar sensor that transmits and/or receives radar signals, and/or the motion and velocity of a vehicle (automated or otherwise) on which the radar sensor is employed, mounted, etc.

The increase in unambiguous velocity estimation capability is effectuated by a decrease in ramp time, thus decreasing the pulse repetition interval (PRI), but this also results in a reduction in range resolution. Therefore, the decrease in PRI is employed during events where high speeds are necessary and the radar sensor system decreases the duration of the ramp to provide increased unambiguous velocity detection capability. When the event is over and the vehicle slows down, the PRI is increased to cause a resulting increase in range resolution.

Decreasing range resolution in these situations also has beneficial effects; in high-velocity situations radars often exhibit range migration. Decreasing the range resolution localizes the reflected signal power in a given cell, which increases the power of the detected signal, thereby improving radar sensitivity.

According to an aspect, a method of controlling a maximum unambiguous velocity of a radar sensor system based on an ego motion velocity of the radar sensor system is provided. The method involves monitoring a velocity at which a radar sensor is moving (ego velocity) and detecting changes therein. A PRI assigned to the sensor is adjusted based on the ego velocity changes, where the PRI adjustment is inversely proportional to the ego velocity change. For instance, the sensor may be assigned a predefined PRI, which is used when the sensor is traveling below a predetermined threshold ego velocity. When the sensor exceeds the threshold ego velocity, the PRI is decreased by a predetermined percentage or amount in order to increase a maximum measurable unambiguous velocity for detection of target objects.

In one embodiment, the reduced PRI is calculated in real time as a function of the ego velocity of the sensor and the maximum expected velocity of a target object. In one embodiment, multiple thresholds are provided such that as the sensor ego velocity increases beyond each threshold, an additional PRI reduction is performed. When the sensor's ego velocity decreases below a given ego velocity threshold, a corresponding PRI increase is performed. In this manner, velocity resolution for the radar sensor is increased when the sensor is traveling at high speeds that would normally compromise velocity resolution.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
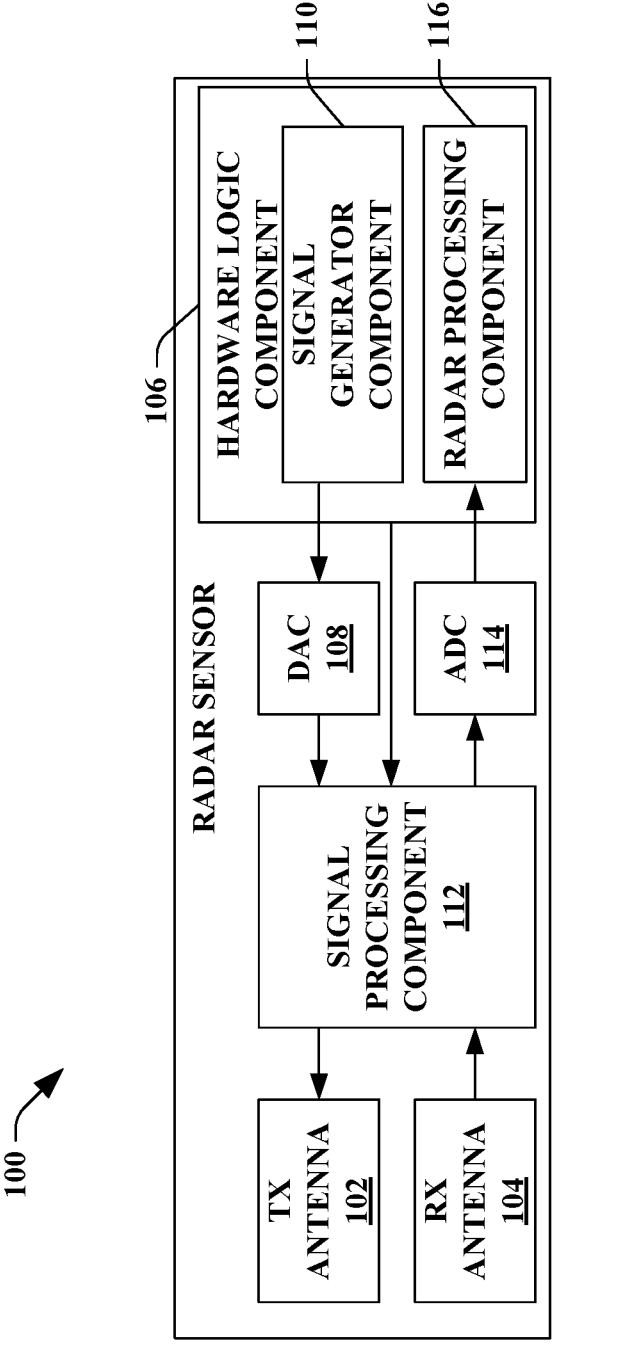
FIG. 1 is a functional block diagram of an exemplary radar sensor.

Various technologies pertaining to automated vehicle (and other) radar sensor systems are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Examples set forth herein pertain to an autonomous vehicle including a radar sensor system that dynamically adjusts pulse repetition interval (PRI) of a radar signal based on ego motion of the radar sensor system or vehicle utilizing the techniques set forth herein. It is to be understood, however, that the radar sensor system described herein can be employed in a variety of different scenarios, such as flight, in drone technologies, in monitoring technologies (e.g., security technologies), and so forth. Autonomous vehicles are set forth herein as one possible use case and features of the claims are not to be limited to autonomous vehicles unless such claims explicitly recite an autonomous vehicle.

Concurrently providing high range and angular resolution and high unambiguous velocity estimation capability in today's automotive radar sensor systems is challenging. High range resolution can require higher ramp bandwidth, and a high unambiguous velocity span involves low pulse repetition interval (PRI). This can require the ramps in the signal waveform to be quite steep, which in turn requires a high ADC sampling rate in order to provide a sufficiently large maximum range of detection. Unambiguous velocity estimation can be compromised in exchange for high range resolution due to limitations associated with high ADC sampling rates. Radar sensors employing a long PRI have the disadvantage of reduced unambiguous velocity estimation capability.

"Ego motion" refers to the movement of a radar platform, such as an autonomous vehicle or a radar sensor mounted thereon and can have a significant impact on the performance of frequency modulated continuous wave (FMCW) radar sensor systems. FMCW radar is often used in applications such as automotive radar and weather radar due to its ability to measure range, velocity, and angle with high accuracy.

In situations where ego motion velocity (velocity of the host vehicle or radar sensor mounted thereon) is high, the Doppler frequency shift caused by the motion of the radar platform can become significant and lead to velocity ambiguity. This can result in ambiguous velocity estimates, which can be particularly problematic in automotive applications where the velocity of other vehicles on the road needs to be accurately measured.

To overcome these problems and others, the described aspects facilitate designing a FMCW waveform so that it can compensate for ambiguity in velocity information using ego motion information. An increase in an estimated unambiguous velocity range can occur due to a decrease in PRI, which also results in a reduction in range resolution. For this reason, it can be desirable in situations where high speeds are necessary, to decrease the duration of the ramp and thereby decrease the PRI and the range resolution. Decreasing the range resolution also can be beneficial because, in high velocity situations, radars often experience range migration. By decreasing range resolution, reflected signal power becomes more localized in a given cell, which improves radar sensitivity.

With reference now to FIG. 1, an exemplary radar sensor (also referred to as a radar sensor system) 100 is illustrated, in which various features, circuits, etc. described herein can be employed. The radar sensor 100 includes a transmit antenna 102, a receive antenna 104, and a hardware logic component 106. While one transmits antenna 102 and one receive antenna 104 are depicted in FIG. 1, it is contemplated that the radar sensor system 100 can include substantially any number or transmit antennas (each substantially similar to the transmit antenna 102) and/or substantially any number of receive antennas (each substantially similar to receive antenna 104). The hardware logic component 106 is configured to prepare radar signals that are transmitted by the transmit antenna 102, and to compute target solutions indicating estimated positions and/or velocities of objects based upon radar returns received by the receive antenna 104. In exemplary embodiments, various components of the radar sensor 100 can be integrated as a same system-on-a-chip (SoC). According to other embodiments, one or more components of the radar sensor system 100 can be discrete component(s). In various embodiments, the radar sensor 100 can be employed on a vehicle, such as a land vehicle, an aircraft, to identify positions and velocities of objects in the operational environment of the vehicle.

The radar sensor 100 further comprises one or more DACs 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a phase modulated continuous wave (PMCW) radar sensor.

The radar signal generated by the signal generator 110 can be an analog signal having various desired signal characteristics. For example, the radar signal generated by the signal generator 108 can be a frequency modulated continuous wave (FMCW) radar signal. Following this example, the signal generator 108 can control characteristics of the FMCW radar signal such as pulse shape, bandwidth of a pulse, pulse repetition interval (PRI), period of a pulse (e.g., period of a ramp), slope of a pulse, start frequency of a pulse, and the like. While many of the examples set forth herein describe the radar signal as being an FMCW radar signal, it is to be appreciated that these examples can be extended to other types of radar signals transmitted in steps, linear ramps, etc. (e.g., stepped orthogonal frequency division multiplexing (OFDM) radar, stepped phase modulated continuous wave (PMCW) radar, etc.). For instance, unambiguous velocity can similarly be limited in radar sensor systems that digitally modulate the radar signal based on stepped modulation, such as stepped carrier OFDM radar; thus, the examples set forth herein can be extended to the radar signal generated by the signal generator 108 being an OFDM radar signal in other embodiments.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more ADCs 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar processing component 116. The radar processing component 116 is configured to compute positions and/or velocities of targets in the operational environment of the radar sensor 100 based upon the radar data. In a non-limiting example, the radar processing component 116 can compute a range, a bearing, and/or a velocity of a target in the operational environment of the sensor 100 based upon the radar data.

Figure 2:
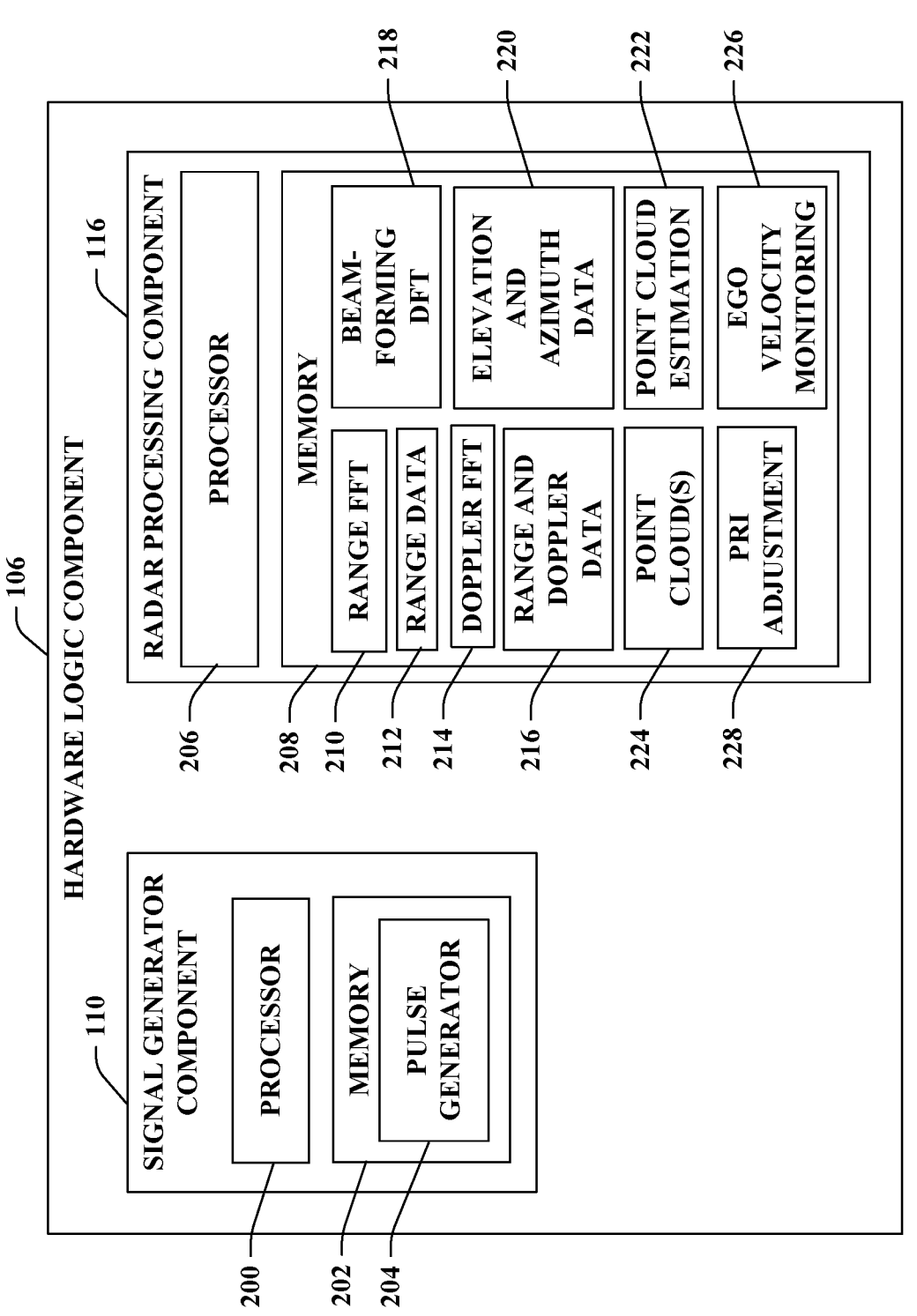
FIG. 2 illustrates a more detailed view of the hardware logic component.

With reference now to FIG. 2, a more detailed view of the hardware logic component 106 is illustrated. The hardware logic component 106 comprises the signal generator component 110 and the radar processing component 116, as discussed with regard to FIG. 1. The signal generator component 110 comprises a processor 200 and a memory 202 configured to provide certain functionality as described herein. For example, the memory 202 can store computer-executable instructions that, when executed by the processor 200, cause the signal generator component 110 to perform certain acts. The memory 202 comprises a ramp/pulse generator component 204 that generates ramps/pulses (depending on the type of radar sensor system) for transmission. In one embodiment, the ramp/pulse generator component 204 performs time division multiplexing and/or frequency division multiplexing on the signals to be transmitted.

The radar processing component 116 comprises a processor 206 and a memory 208 configured to provide certain functionality as described herein. For example, the memory 208 can store computer executable instructions that, when executed by the processor 206, cause the radar processing component 116 to perform certain acts. The memory 208 comprises a range fast Fourier transform (FFT) component 210 that is executed on a digitized signal received from an ADC, such as the ADC 114 of FIG. 1, to generate range data 212 for objects detected in a received radar return. A Doppler FFT 214 is executed on the range data to generate range and Doppler data 216. A discrete Fourier transform (DFT) 218 is then executed on the range and Doppler data to generate elevation and azimuth data 220. A point cloud estimation component 222 is executed to generate one or more point clouds 224 representing at least the range data 212, the range and Doppler (velocity) data 216, and the elevation and azimuth data 220. However, it will be appreciated that the point cloud is not limited to representing only these data types. Rather, the point cloud can also include data points representing other data types, including but not limited to point density data, radar cross-section (RCS) data, etc.).

The memory 208 further comprises an ego velocity monitoring component 226 that monitors ego velocity of the sensor in which the hardware logic component 106 is employed. Ego velocity information can be received by the sensor from an autonomous vehicle in which the sensor is employed. In another embodiment, ego velocity information is received from a central processing unit (see FIG. 3) that estimates vehicle and/or sensor ego velocity or receives ego velocity information from the autonomous vehicle (e.g., via a speedometer or the like). The ego velocity monitoring component 226 detects changes in the velocity of the vehicle and/or the sensor, and in response thereto a PRI adjustment component 228 adjusts the PRI of the radar signal transmitted by the sensor. For instance, when the ego velocity monitoring component 226 detects an increase in the ego velocity of the sensor and/or vehicle, the PRI adjustment component 228 reduces the PRI of the radar signal. When the ego velocity monitoring component 226 detects a decrease in the ego velocity of the sensor and/or vehicle, the PRI adjustment component 228 increases the PRI of the radar signal.

In one embodiment, thresholding is used to trigger PRI adjustments. For instance, when an ego velocity increase of a predetermined amount (e.g., 0.3 m/s 0.5 m/s, 0.8 m/s, 1 m/s, 1.4 m/s, 2 m/s, 5 m/s, etc., or some other predetermined amount) or percentage (e.g., 1%, 2%, 5%, 7%, 10%, or some other predetermined percentage) is detected, the PRI for the sensor is reduced by a corresponding predetermined amount or percentage. Similarly, when an ego velocity decrease of a predetermined amount or percentage is detected, the PRI for the sensor is increased by a corresponding amount or percentage. In this manner, PRI is adjusted periodically or continuously as ego velocity increases and decreases during travel. It will be understood that the foregoing threshold amounts and percentages are provided by way of example only and are not to be construed in a limiting sense.

Figure 3:
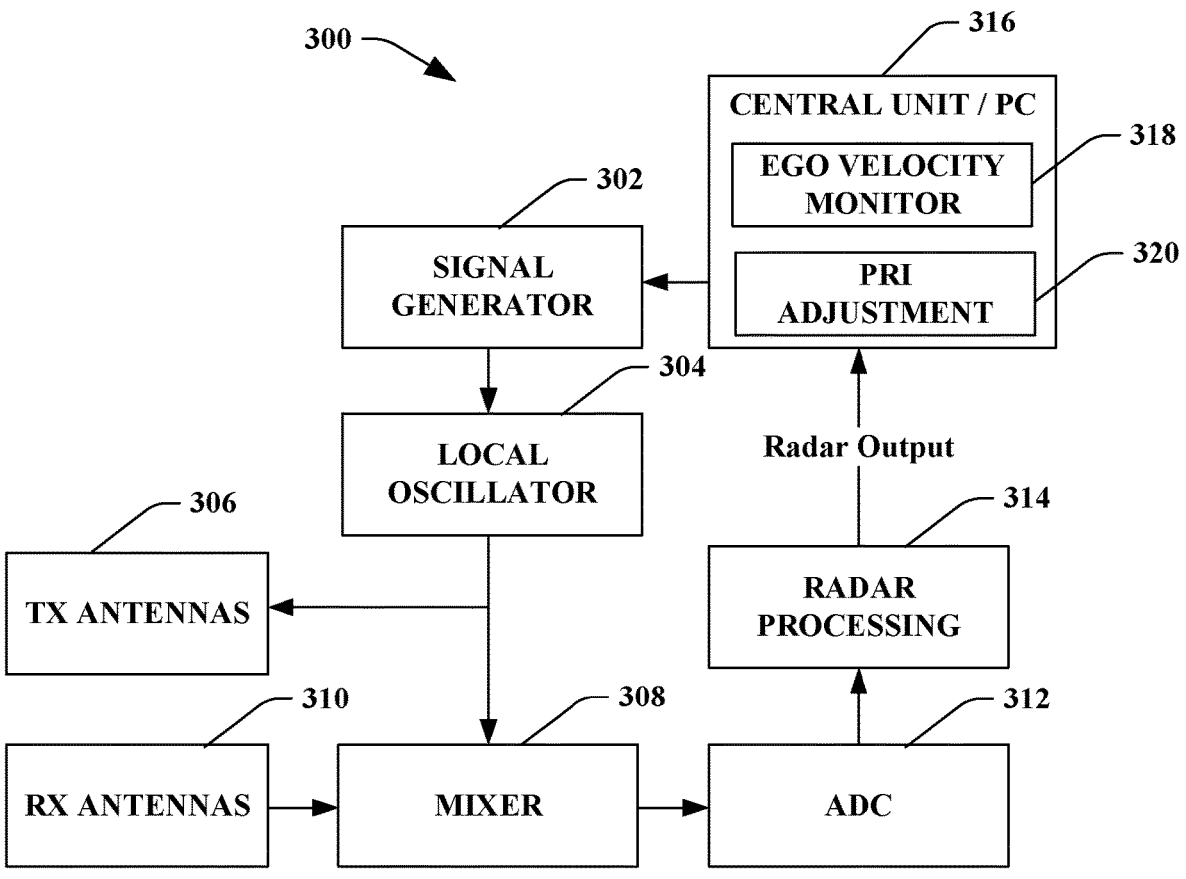
FIG. 3 shows another example of a radar sensor.

FIG. 3 shows another example of a radar sensor 300. The sensor 300 comprises a signal generator 302 that provides a signal to a local oscillator 304. The local oscillator 304 adjusts the signal for transmission via one or more transmit antennas 306. The local oscillator 304 also provides the transmit signal to a mixer 308, which combines the transmit signal with signals that have been reflected by an object and received by one or more receive antennas 310. The combined signal is then provided by the mixer 308 to an ADC 312, which digitizes the combined signal and provides the digitized signal to a radar processing component 314.

The radar processing component 314 performs various acts on the digitized signal and provides functionality similar or identical to the functionality provided by the radar processing component 116 of the hardware logic component 106 (see, e.g., FIGS. 1 and 2). The radar processing component 314 generates one or more point clouds, which are then transmitted to a central processing unit or computer (CPU) 316 for processing. In another embodiment, the central processing unit 316 can receive raw data from the radar processing component 314 for processing.

The central unit 316 comprises an ego velocity monitoring component 318 that monitors an ego velocity of a vehicle on which the radar sensor is employed. The ego velocity monitoring component 318 functions in a manner similar or identical to the velocity monitoring component 226 of FIG. 2. In one embodiment, the central processing unit receives velocity information from a speedometer (not shown) of the host vehicle. The central unit 316 also comprises a PRI adjustment module 320 that functions in a manner similar or identical to the PRI adjustment module 228 of FIG. 2.

Figure 4:
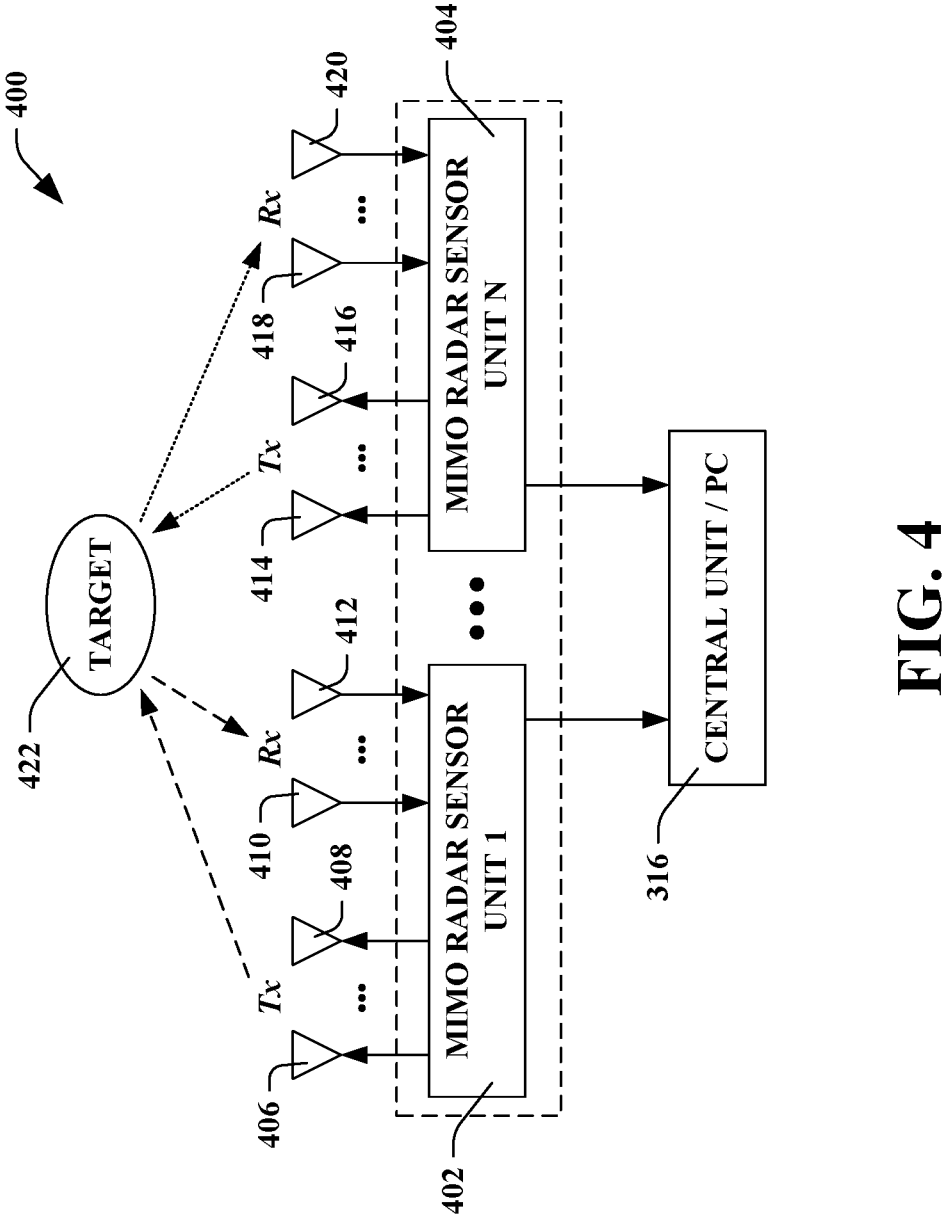
FIG. 4 is an illustration of a radar network.

FIG. 4 is an illustration of a radar network 400 such as may be employed in conjunction with various features described herein. The radar network 400 comprises a first MIMO radar sensor 402 through an Nth radar sensor 404 (wherein N is an integer greater than 1), that provide one or both of point cloud data or raw data to a central unit 316. The first MIMO Radar sensor 402 comprises a plurality of transmit antennas 406, 408, and a plurality of receive antennas 410, 412. Similarly, the Nth MIMO radar sensor 404 comprises a plurality of transmit antennas 414, 416, and a plurality of receive antennas 418, 420. Transmit antennas 406, 408 transmit a signal, the signal being reflected by a target 422, and the reflected signal being received by the plurality of receive antennas 410, 412. Similarly, transmit antennas 414, 416 transmit a signal, the signal being reflected by the target 422, and the reflected signal being received by the plurality of receive antennas 418, 420.

In one embodiment, the MIMO radar sensors 402, 404 transmit raw radar data to the central unit 316 for processing. In another embodiment, the MIMO radar sensors 402, 404 process the received signals and generate respective point clouds including at least velocity and range data, which are transmitted to the central unit 316 for velocity and/or range estimation, target object identification, etc.

When the central unit 316 detects fluctuations in the ego motion of the sensors (or the vehicle on which the sensors are employed), the central unit adjusts the PRI of the sensors accordingly as described herein. For example, if the radar sensors are designed to use a predefined PRI when traveling at, e.g., up to 20 m/s, and a PRI adjustment threshold (a predetermined ego velocity threshold) of 1 m/s, then an increase in ego velocity beyond 20 m/s will trigger a downward adjustment in the PRI of the sensors 402, 404. A further increase in ego velocity to 21 m/s will trigger an additional downward adjustment in the PRI of the sensors 402, 404, and so on. A decrease in ego velocity to below 21 meters per second will trigger an increase in the PRI of the sensors 402, 404. A further decrease in ego velocity to below 20 m/s will trigger a further increase in the PRI of the sensors 402, 404 back to the original predefined PRI setting of the sensors 402, 404. It will be understood that while the foregoing example describes two predetermined ego velocity thresholds, the aspects described herein are not limited thereto, but rather can employ any desired number of ego velocity thresholds at any desired ego velocity intervals.

Figure 5:
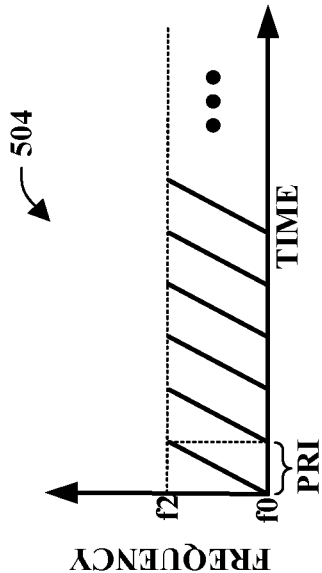
FIG. 5 illustrates different ramp/pulse patterns having different PRIs.
Figure 5:
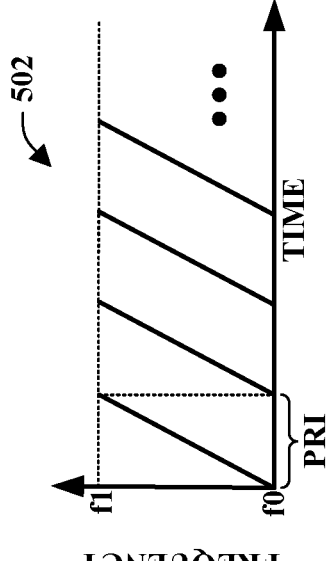

FIG. 5 illustrates different ramp/pulse patterns having different PRIs, which can be employed to facilitate accurate velocity estimation of target objects when ego velocity is high (above a predetermined ego velocity threshold). The first pattern 502 shows a sawtooth signal having a first PRI, where each ramp increases from a first frequency $f_0$ to a second frequency $f_1$ that is higher than the first frequency. Upon a determination that ego velocity of the sensor has increased to a level above a predetermined threshold, the PRI for the sensor is reduced as shown in signal pattern 504. In one embodiment, the slope of the radar signal ramps is kept constant, while the upper frequency of the ramp is reduced to $f_2$. This results in an increase in the number of ramps transmitted per unit time, thereby reducing the PRI of the radar signal.

With a decrease in the duration of the PRI, if the same number of ramps are maintained there will be a decrease in the velocity resolution proportional to the decrease in the PRI. Therefore, the PRI adjustment component 228, 320 (FIGS. 2 and 3) increases the number of ramps per unit time to maintain the same or similar velocity resolution. Total processing complexity does not increase when increasing the number of ramps, since processing range resolution decreases due to the reduction of samples from each ramp.

Radar sensor systems radiate each pulse at the carrier frequency during transmit time (or pulse width (PW)), then wait for returning echoes during listening or rest time, and then radiate the next pulse as shown in FIG. 5. The time between the beginning of one pulse and the start of the next pulse is called the pulse repetition interval (PRI). According to various aspects described herein, the duration time of a FMCW ramp is estimated in relation to the speed of the host vehicle (ego motion). According to an example, if the maximum expected (detectable) speed of a target vehicle to be measured by radar is $V_{exp}$=+/−40 m/s, the maximum unambiguous speed value that the radar will specify is 40 m/s+the ego velocity of the host vehicle. The PRI of the radar sensor is given by:

$$V_{max} = \frac{c}{(PRI \times f_c)};$$

$$V_{max} = V_{exp} + V_{ego} = \frac{c}{(PRI \times f_c)}; \text{ therefore,}$$

$$PRI = \frac{c}{((V_{exp} + V_{ego}) \times f_c)}.$$

where c is the signal speed (in this example, the speed of light) and $f_c$ is the carrier frequency. Thus, as $V_{ego}$ changes, the PRI is adjusted as a function thereof.

Once the PRI has been defined, the range resolution can be defined as:

$$\Delta R = \frac{c \times PRI}{2}.$$

In the foregoing example, the PRI is assumed to be equal to the ramp duration. In another embodiment, the values may be slightly different (e.g., in cases where a delay is inserted between ramps to increase PRI). When a radar is initially designed to support detection of an unambiguous speed of $V_{exp}$, if the value of $V_{ego}$ is equal to $V_{exp}$, then the scale for the resolution of range is 0.5.

Figure 6:
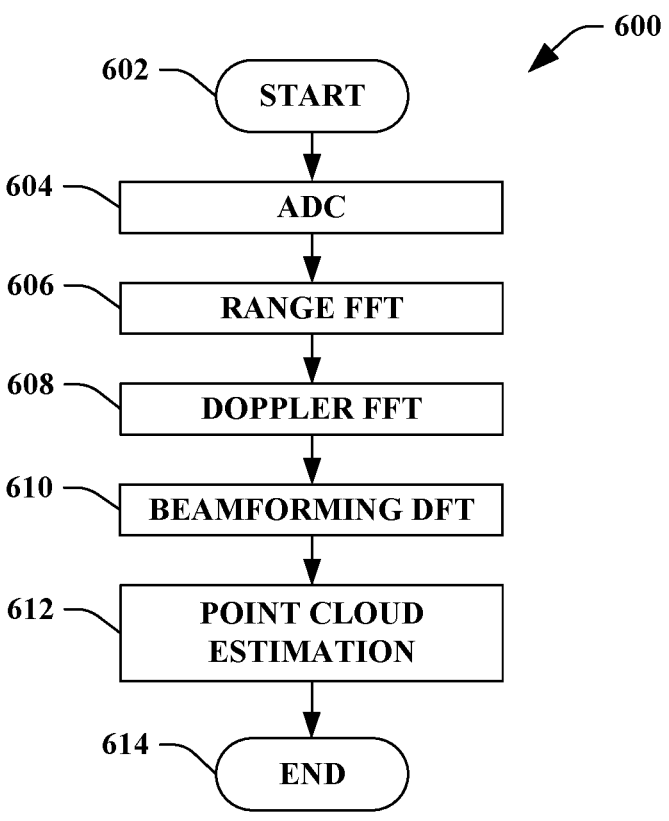
FIG. 6 illustrates a methodology for generating a radar point cloud for use in target object detection and identification.
Figure 7:
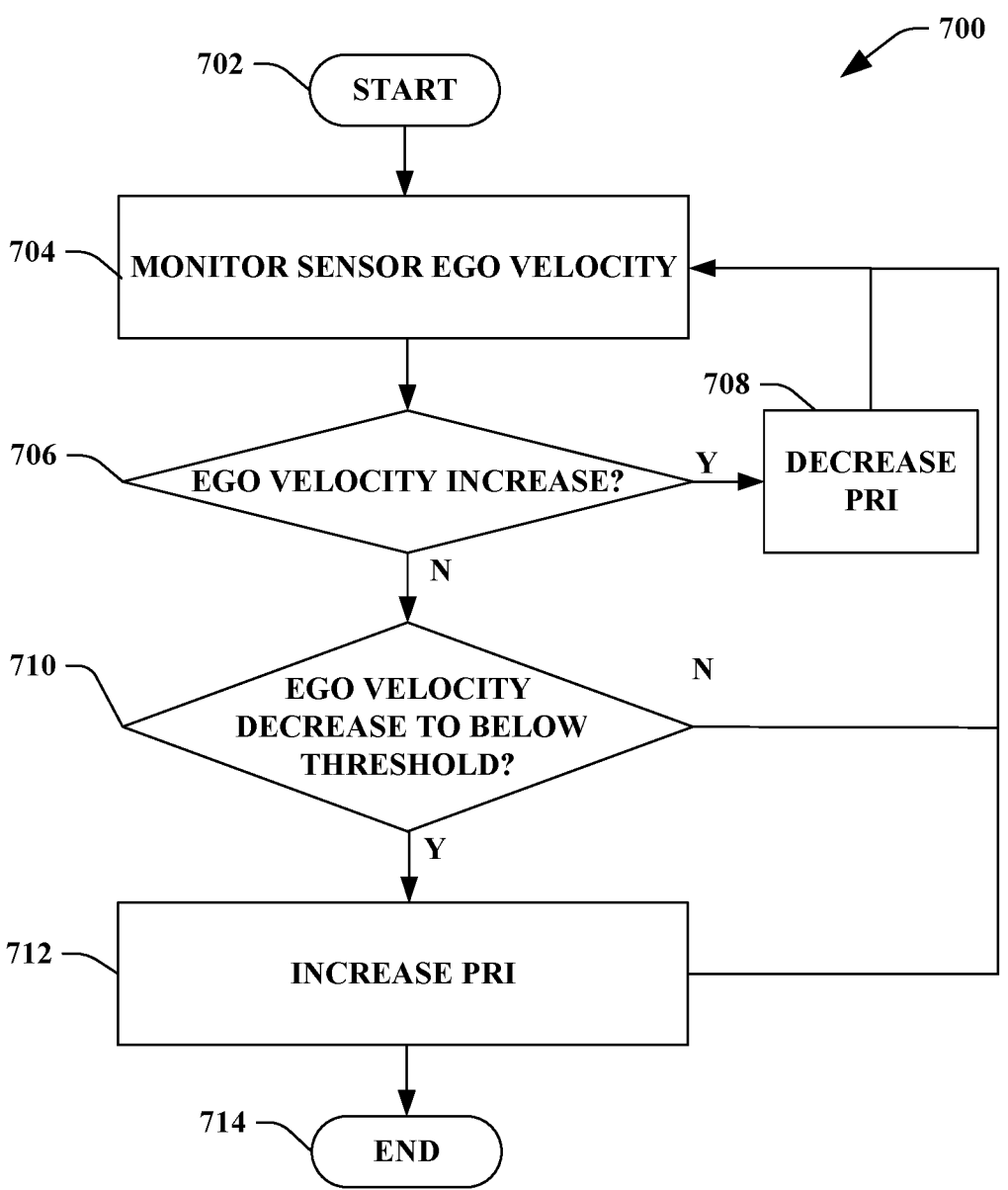
FIG. 7 illustrates a methodology for improving radar velocity resolution at high speeds by adjusting PRI based on ego velocity of the radar sensor.

FIGS. 6-7 illustrate exemplary methodologies relating to improving radar velocity resolution at high speeds by adjusting PRI based on ego velocity of the radar sensor. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now solely to FIG. 6, a methodology 600 is illustrated for generating a radar point cloud for use in target object detection and identification. At 602, the method begins. At 604, at a given radar sensor, analog to digital conversion is performed on each signal acted by target object and received by the sensor. This step is performed for each array element (e.g., Tx/Rx pair). Once the received signals have been digitized, then at 606, a range fast Fourier transform is executed thereon to generate range data for the detected object. At 608, a Doppler fest for your transform is executed on the range data in order to generate range and Doppler data. At 610, a beamforming discrete Fourier transform is executed on the range and Doppler data to generate elevation and azimuth data. At 612, the range data, the range and Doppler data, and the elevation and azimuth data are used for point cloud estimation. The method terminates at 614. The point cloud is then provided to the central unit 316 for target identification.

FIG. 7 illustrates a methodology 700 for improving radar velocity resolution at high speeds by adjusting PRI based on ego velocity of the radar sensor. At 702, the method begins. At 704, ego velocity of the sensor and/or the vehicle in which the sensor is employed is monitored. At 706, a determination is made regarding whether the ego velocity has increased and exceeded a predetermined ego velocity threshold. If the ego velocity has increased by a predetermined amount or percentage to exceed the ego velocity threshold, then at 708 a current PRI of the sensor is decreased accordingly. The method then reverts to 704 for continued monitoring of ego velocity.

If the ego velocity has not increased, then at 710 a determination is made regarding whether the ego velocity has decreased to a level below a predetermined ego velocity threshold. If the ego velocity has not decreased by the predetermined amount or percentage, then the method reverts to 704 for continued monitoring of the ego velocity. If the ego velocity has decreased to below a predetermined ego velocity threshold, then at 712 the PRI of the sensor is increased accordingly, and the method reverts to 704 for continued monitoring of the ego velocity. At 714, the method terminates.

In one embodiment, the velocity change detections are performed using one or more predetermined ego velocity thresholds. For instance, multiple thresholds can be employed to continuously decrease the PRI as the vehicle accelerates beyond an initial predetermined ego velocity threshold and additional higher thresholds, and to continuously increase the PRI as the vehicle decelerates back down through the ego velocity thresholds to a velocity below the initial predetermined ego velocity threshold. According to one aspect, the plurality of predetermined ego velocity thresholds having increments that are equally spaced (e.g., 20 m/s, 25 m/s, 30 m/s, 35 m/s, . . . , etc.). The increments between the ego velocity thresholds can be larger (as large as desired, e.g., 6 m/s, 8 m/s, 12 m/s, etc.) to reduce computational load, or can be smaller (as small as desired, e.g., 0.001 m/s, 0.1 m/s, 0.5 m/s, 1 m/s, etc.) to approximate continuous PRI adjustment. I.e., the PRI adjustments become more continuous as the ego velocity threshold interval approaches zero. The increments between ego velocity thresholds can be equal or can be unequal.

In another embodiment, the increments between ego velocity thresholds and based on percentages. For instance, an initial ego velocity threshold is set, below which a predefined PRI is employed for radar signal transmission and above which PRI adjustment is performed, as in the foregoing examples. The threshold interval may be selected to be a percentage of the initial ego velocity threshold value. For example, if the initial ego velocity threshold is set to 15 m/s, and the interval is set to 10%, then subsequent ego velocity thresholds will occur at 16.5 m/s, 18 m/s, 19.5 m/s, and so on. Each time the vehicle and/or radar sensor accelerates through a threshold, the PRI is further reduced. As the vehicle and/or sensor decelerates back through the respective thresholds the PRI is accordingly increased until the ego velocity is below the initial ego velocity threshold. It will be understood that the examples of velocity increment amounts and percentages set forth above are provided by way of example and are not intended to be construed in a limiting manner.

Figure 8:
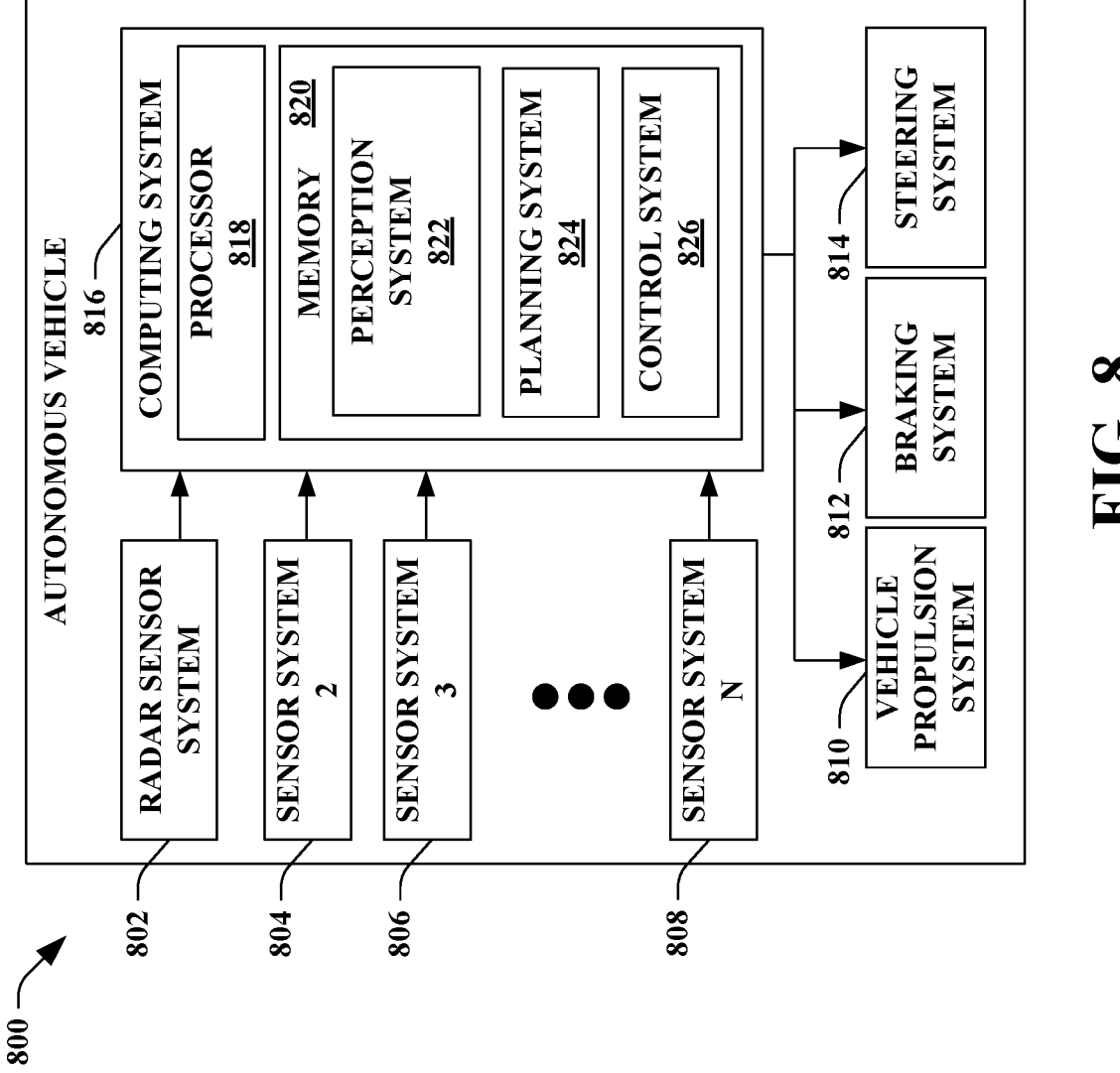
FIG. 8 is a functional block diagram of an exemplary AV.

Various technologies described herein are suitable for use in connection with an autonomous vehicle (AV) that employs a radar sensor system to facilitate navigation about roadways. Referring now to FIG. 8, an exemplary AV 800 is illustrated, wherein the AV 800 can navigate about roadways without human conduction based upon sensor signals output by sensor systems of the AV 800. The AV 800 includes a plurality of sensor systems 802-808 (a first sensor system 802 through an Nth sensor system 808). The sensor systems 802-808 may be of different types. For example, the first sensor system 802 is a radar sensor system, the second sensor system 804 may be a LiDaR sensor system, the third sensor system 806 may be a camera (image) system, and the Nth sensor system 808 may be a sonar system. Other exemplary sensor systems include GPS sensor systems, inertial sensor systems, infrared sensor systems, and the like. The various sensor systems 802-808 are arranged about the AV 800. The sensor systems 802-808 are configured to repeatedly (e.g., continuously, or periodically) output sensor data that is representative of objects and conditions in the driving environment of the AV 800.

The AV 800 further includes several mechanical systems that are used to effectuate appropriate motion of the AV 800. For instance, the mechanical systems can include but are not limited to, a vehicle propulsion system 810, a braking system 812, and a steering system 814. The vehicle propulsion system 810 may be an electric engine, an internal combustion engine, or a combination thereof. The braking system 812 can include an engine brake, brake pads, actuators, a regenerative braking system, and/or any other suitable componentry that is configured to assist in decelerating the AV 800. The steering system 814 includes suitable componentry that is configured to control the direction of movement of the AV 800.

The AV 800 additionally comprises a computing system 816 that is in communication with the sensor systems 802-808 and is further in communication with the vehicle propulsion system 810, the braking system 812, and the steering system 814. The computing system 816 includes a processor 818 and memory 820 that includes computer-executable instructions that are executed by the processor 818. In an example, the processor 818 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 820 comprises a perception system 822, a planning system 824, and a control system 826. Briefly, the perception system 822 is configured to identify the presence of objects and/or characteristics of objects in the driving environment of the AV 800 based upon sensor data output by the sensor systems 802-808. The planning system 824 is configured to plan a route and/or a maneuver of the AV 800 based upon data pertaining to objects in the driving environment that are output by the perception system 822. The control system 826 is configured to control the mechanical systems 812-814 of the AV 800 to effectuate appropriate motion to cause the AV 800 to execute a maneuver planned by the planning system 824.

The perception system 822 is configured to identify objects in proximity to the AV 800 that are captured in sensor signals output by the sensor systems 802-808. By way of example, the perception system 822 can be configured to identify the presence of an object in the driving environment of the AV 800 based upon images generated by a camera system included in the sensor systems 804-808. In another example, the perception system 822 can be configured to determine a presence and position of an object based upon radar data output by the radar sensor system 802. In exemplary embodiments, the radar sensor system 802 can be or include the radar sensor 100 and/or 300. In such embodiments, the perception system 822 can be configured to identify a position of an object in the driving environment of the AV 800 based upon the estimated range output by the radar sensor 100 and/or 300.

The AV 800 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B. A. D. C. Such configurations can mitigate the effects of interference when multiple A Vs that employ radar sensor systems are operating in a same driving environment.

Figure 9:
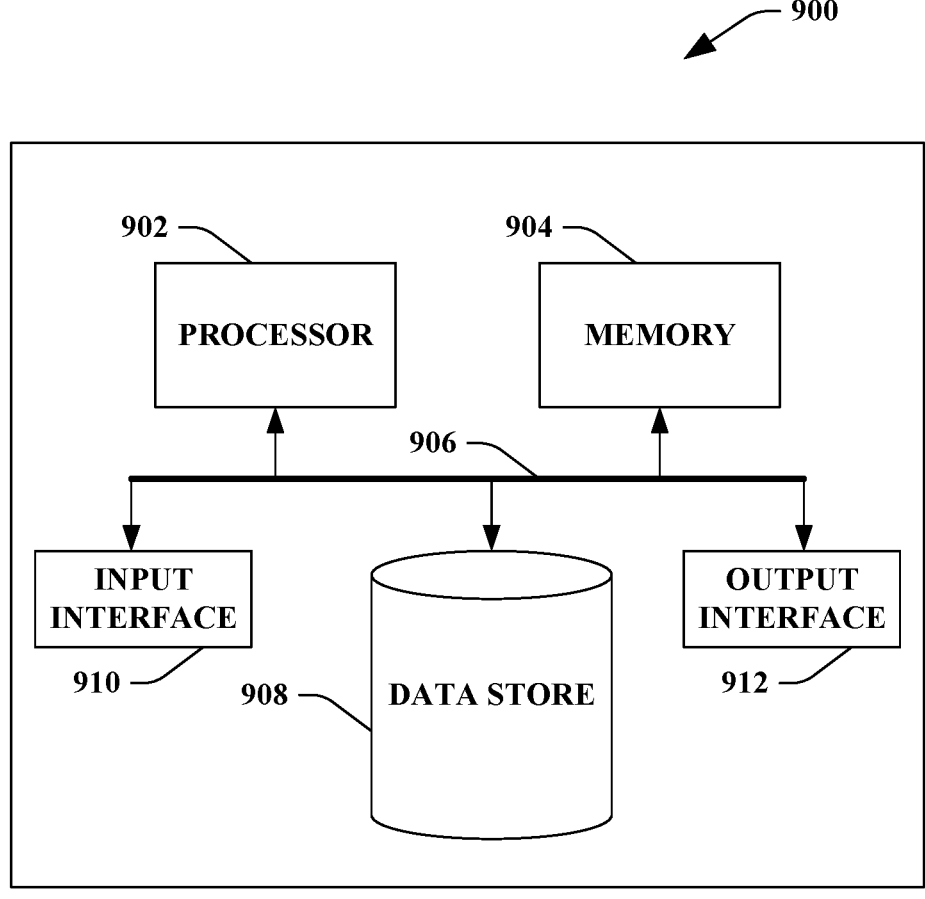
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 816. The computing device 900 includes at least one processor 902 that executes instructions that are stored in a memory 904. The instructions may be, for instance, instructions for implementing functionality described as being carried out by one or more modules, components, or systems discussed above or instructions for implementing one or more of the methods described above. The processor 902 may be a GPU, a plurality of GPUs, a CPU, a plurality of CPUs, a multi-core processor, a combination of the foregoing, etc. The processor 902 may access the memory 904 by way of a system bus 906. In addition to storing executable instructions, the memory 904 may also store radar data, beamformed radar data, neural network configurations, etc.

The computing device 900 additionally includes a data store 908 that is accessible by the processor 902 by way of the system bus 906. The data store 908 may include executable instructions, radar data, beamformed radar data, embeddings of these data in latent spaces, etc. The computing device 900 also includes an input interface 910 that allows external devices to communicate with the computing device 900. For instance, the input interface 910 may be used to receive instructions from an external computing device, etc. The computing device 900 also includes an output interface 912 that interfaces the computing device 900 with one or more external devices. For example, the computing device 900 may transmit control signals to the vehicle propulsion system 810, the braking system 812, and/or the steering system 814 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Described herein are various technologies according to at least the following examples.

(A1) In an aspect, a method performed by a radar sensor system includes transmitting by a radar sensor a radar signal having a predefined pulse repetition interval (PRI). The method further includes monitoring ego velocity of the radar sensor. The method also includes detecting that the ego velocity has exceeded a first predetermined ego velocity threshold. Additionally, the method includes increasing the predefined pulse repetition interval (PRI) based on the first predetermined velocity threshold.

(A2) In some embodiments of the method of (A1), the first predetermined ego velocity threshold represents an ego velocity below which the predefined PRI is applied for radar signal transmission, and above which PRI adjustment is performed.

(A3) In some embodiments of the method of at least one of (A1)-(A2), the method further includes detecting that the ego velocity has exceeded at least a second predetermined ego velocity threshold that is higher than the first predetermined ego velocity threshold by at least one of a predetermined amount and a predetermined percentage, and further decreasing the PRI based on the second predetermined ego velocity threshold.

(A4) In some embodiments of the method of at least one of (A1)-(A3), the method further includes employing a plurality of ego velocity thresholds.

(A5) In some embodiments of the method of (A4), the method further includes detecting a decrease in the ego velocity to a level below a given ego velocity threshold, and increasing the PRI based on the given ego velocity threshold.

(A6) In some embodiments of the method of at least one of (A1)-(A5), the method further includes detecting a decrease in the ego velocity to a level below the first predetermined ego velocity threshold and increasing the PRI to the predefined PRI.

(A7) In some embodiments of the method of (A6), the method further includes calculating PRI adjustments based on at least a maximum detectable velocity of a target object and the ego velocity of the sensor.

(B1) In another aspect, a radar system is configured to perform at least one of the methods disclosed herein (e.g., any of the methods of (A1)-(A7)).

(C1) In yet another aspect, a radar system includes a hardware logic component (e.g., circuitry), where the hardware logic component is configured to control elements of a radar system to perform at least one of the methods disclosed herein (e.g., any of the methods of (A1)-(A7)).

(D1) In yet another aspect, a radar sensor system includes a transmit antenna configured to transmit a radar signal into an environment of the radar sensor system. The radar sensor system further includes a receive antenna configured to receive a return signal from the environment of the radar sensor system responsive to the radar signal. Additionally, the radar sensor system includes radar processing circuitry that is configured to perform certain acts. The acts include causing the transmit antenna to transmit a radar signal having a predefined pulse repetition interval (PRI) the acts further include monitoring ego velocity of the radar sensor. The acts also include adjusting the predefined pulse repetition interval (PRI) based on the ego velocity of the radar sensor.

(D2) In some embodiments of the radar sensor system of (D1), the acts further include detecting that the ego velocity has exceeded a first predetermined ego velocity threshold that represents an ego velocity below which the predefined PRI is applied for radar signal transmission, and above which PRI reduction is performed.

(D3) In some embodiments of the radar sensor system of (D2), the acts further include detecting that the ego velocity has exceeded at least a second predetermined ego velocity threshold that is higher than the first predetermined ego velocity threshold by at least one of a predetermined amount and a predetermined percentage, and further decreasing the PRI based on the second predetermined ego velocity threshold.

(D4) In some embodiments of the radar sensor system of (D3), the acts further include employing a plurality of equally spaced ego velocity thresholds.

(D5) In some embodiments of the radar sensor system of (D4), the acts further include detecting a decrease in the ego velocity to a level below a given ego velocity threshold, and increasing the PRI based on the given ego velocity threshold.

(D6) In some embodiments of the radar sensor system of any one of (D2)-(D5), the acts further include detecting a decrease in the ego velocity to a level below the first predetermined ego velocity threshold and increasing the PRI to the predefined PRI.

(D7) In some embodiments of the radar sensor system of any one of (D1)-(D6), the acts further include calculating PRI adjustments based on at least a maximum detectable velocity of a target object and the ego velocity of the sensor.

(E1) In another aspect, a central processing unit includes a computer-readable medium having stored thereon instructions which, when executed by a processor, cause the processor to perform certain acts. The central processing unit also includes one or more processors configured to execute the instructions. The acts include causing a transmit antenna to transmit a radar signal having a predefined pulse repetition interval (PRI). The acts also include monitoring ego velocity of the radar sensor. The acts further include detecting that the ego velocity has exceeded a first predetermined ego velocity threshold. Additionally, the acts include decreasing the predefined pulse repetition interval (PRI) based on the first predetermined ego velocity threshold.

(E2) In some embodiments of the central processing unit (E1), the first predetermined ego velocity threshold represents an ego velocity below which the predefined PRI is applied for radar signal transmission, and above which PRI adjustment is performed.

(E3) In some embodiments of the central processing unit of at least one of (E1-E2), the acts further include detecting that the ego velocity has exceeded at least a second predetermined ego velocity threshold that is higher than the first predetermined ego velocity threshold by at least one of a predetermined amount and a predetermined percentage, and further decreasing the PRI based on the second predetermined ego velocity threshold.

(E4) In some embodiments of the central processing unit of (E3), the acts further include employing a plurality of equally spaced ego velocity thresholds.

(E5) In some embodiments of the central processing unit of (E4), the acts further include detecting a decrease in the ego velocity to a level below a given ego velocity threshold, and increasing the PRI based on the given ego velocity threshold.

(E6) In some embodiments of the central processing unit of at least one of (E1)-(E5), the acts further include detecting a decrease in the ego velocity to a level below the first predetermined ego velocity threshold and increasing the PRI to the predefined PRI.

(F1) In still yet another aspect, use of any of the radar systems (e.g., any of (B1), (C1), (D1)-(D7) or (E1-E6)) to detect and classify a target is contemplated.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar sensor system, the method comprising:

transmitting by a radar sensor a radar signal having a predefined pulse repetition interval (PRI);

monitoring ego velocity of the radar sensor;

detecting that the ego velocity has crossed one or more predetermined ego velocity thresholds; and decreasing the predefined PRI upon detecting that the ego velocity exceeds one of the one or more predetermined ego velocity thresholds; and increasing the predefined PRI upon detecting that the ego velocity falls below one of the one or more predetermined ego velocity thresholds;

wherein decreasing or increasing the predefined PRI comprises generating a computed PRI value as a function of the ego velocity and a predetermined maximum detectable target radial velocity such that a maximum unambiguous radial velocity for the computed PRI and a carrier frequency of the radar signal is at least equal to a sum of the ego velocity and the predetermined maximum detectable target radial velocity.

2. The method of claim 1, wherein:

a first predetermined ego velocity threshold is one of the one or more predetermined ego velocity thresholds; and the first predetermined ego velocity threshold represents an ego velocity below which the predefined PRI is applied for radar signal transmission, and above which the predefined PRI is decreased.

3. The method of claim 1, further comprising detecting that the ego velocity has exceeded a second predetermined ego velocity threshold that is one of the one or more predetermined ego velocity thresholds that is higher than the first predetermined ego velocity threshold by at least one of a predetermined amount and a predetermined percentage, and further decreasing the predefined PRI upon detecting that the ego velocity exceeds the second predetermined ego velocity threshold.

4. The method of claim 1, wherein the one or more predetermined ego velocity thresholds comprise a plurality of predetermined ego velocity thresholds.

5. The method of claim 4, further comprising detecting a decrease in the ego velocity to a level below one of the plurality of predetermined ego velocity thresholds, and increasing the predefined PRI based on the one of the plurality of the predetermined ego velocity thresholds.

6. The method of claim 1, further comprising detecting a decrease in the ego velocity to a level below a first predetermined ego velocity threshold, the first predetermined ego velocity threshold being one of the one or more predetermined ego velocity thresholds and increasing the predefined PRI.

7. The method of claim 6, further comprising generating the computed PRI value based on at least the predetermined maximum detectable target radial velocity and the ego velocity of the radar sensor.

8. A radar sensor system comprising:

a transmit antenna configured to transmit a radar signal into an environment of the radar sensor system;

a receive antenna configured to receive a return signal from the environment of the radar sensor system responsive to the radar signal; and radar processing circuitry that is configured to perform acts comprising:

causing the transmit antenna to transmit a radar signal having a predefined pulse repetition interval (PRI);

monitoring ego velocity of the radar sensor;

detecting that the ego velocity has crossed one or more predetermined ego velocity thresholds;

decreasing the predefined PRI upon detecting that the ego velocity exceeds one of the one or more predetermined ego velocity thresholds; and increasing the predefined PRI upon detecting that the ego velocity falls below one of the one or more predetermined ego velocity thresholds; and wherein decreasing or increasing the predefined PRI comprises generating a computed PRI value as a function of the ego velocity and a predetermined maximum detectable target radial velocity such that a maximum unambiguous radial velocity for the computed PRI value and a carrier frequency of the radar signal is at least equal to a sum of the ego velocity and the predetermined maximum detectable target radial velocity.

9. The radar sensor system of claim 8, further comprising detecting that is one of the one or more predetermined ego velocity thresholds that represents an ego velocity below which the predefined PRI is applied for radar signal transmission, and above which the predefined PRI is decreased.

10. The radar sensor system of claim 9, further comprising detecting that the ego velocity has exceeded a second predetermined ego velocity threshold that is one of the one or more predetermined ego velocity thresholds that is higher than the first predetermined ego velocity threshold by at least one of a predetermined amount and a predetermined percentage, and further decreasing the predefined PRI upon detecting that the ego velocity exceeds the second predetermined ego velocity threshold.

11. The radar sensor system of claim 10, wherein the one or more predetermined ego velocity thresholds comprise a plurality of equally spaced predetermined ego velocity thresholds.

12. The radar sensor system of claim 11 further comprising detecting a decrease in the ego velocity to a level below one of the plurality of predetermined ego velocity thresholds, and increasing the predefined PRI based on the one of the plurality of ego velocity thresholds.

13. The radar sensor system of claim 9, further comprising detecting a decrease in the ego velocity to a level below the first predetermined ego velocity threshold and increasing the predefined PRI PRI.

14. The radar sensor system of claim 8, further comprising generating the computed PRI value based on at least the predetermined maximum detectable target radial velocity and the ego velocity of the radar sensor.

15. A central processing unit comprising:

a computer-readable medium having stored thereon instructions which, when executed by a processor, cause the processor to perform certain acts;

one or more processors configured to execute the instructions, the acts comprising:

causing a transmit antenna to transmit a radar signal having a predefined pulse repetition interval (PRI);

monitoring ego velocity of the radar sensor;

detecting that the ego velocity has crossed one or more predetermined ego velocity threshold; and decreasing the predefined PRI upon detecting that the ego velocity exceeds one of the one or more predetermined ego velocity thresholds; and increasing the predefined PRI upon detecting that the ego velocity falls below one of the one or more predetermined ego velocity thresholds; wherein decreasing or increasing the predefined PRI comprises generating a computed PRI value as a function of the ego velocity and a predetermined maximum detectable target radial velocity such that a maximum unambiguous radial velocity for the computed PRI value and a carrier frequency of the radar signal is at least equal to a sum of the ego velocity and the predetermined maximum detectable target radial velocity.

16. The central processing unit of claim 15, wherein a first predetermined ego velocity threshold is one of the one or more predetermine ego velocity thresholds, and wherein the first predetermined ego velocity threshold represents an ego velocity below which the predefined PRI is applied for radar signal transmission, and above which the predefined PRI is decreased.

17. The central processing unit of claim 15, further comprising detecting that the ego velocity has exceeded a second predetermined ego velocity threshold that is one of the one or more predetermined ego thresholds that is higher than the first predetermined ego velocity threshold by at least one of a predetermined amount and a predetermined percentage, and further decreasing the predefined PRI upon detecting that the ego velocity exceeds the second predetermined ego velocity threshold.

18. The central processing unit of claim 17, wherein the one or more predetermined ego velocity thresholds comprise a plurality of equally spaced predetermined ego velocity thresholds.

19. The central processing unit of claim 18, further comprising detecting a decrease in the ego velocity to a level below one of the plurality of predetermined ego velocity thresholds, and increasing the predefined PRI based on the one of the plurality of predetermined ego velocity thresholds.

20. The central processing unit of claim 15, further comprising detecting a decrease in the ego velocity to a level below a first predetermined ego velocity threshold, the first predetermined ego velocity threshold being one of the one or more predetermined ego velocity thresholds, and increasing the predefined PRI.

\* \* \* \* \*